United States Patent [19]

Blackburn et al.

[11] Patent Number: 4,755,582

[45] Date of Patent: Jul. 5, 1988

[54] THERMOSETTING HIGH SOLIDS COATING COMPOSITION OF HYDROXY-FUNCTIONAL EPOXIES AND ANHYDRIDES

[75] Inventors: William P. Blackburn, Evans City; Ronald R. Ambrose, Allison Park; Samuel Porter, Jr., Natrona Heights; Mary J. Burkholder, Mars, all of Pa.

[73] Assignee: PPG Industries, Inc., Pittsburgh, Pa.

[21] Appl. No.: 898,666

[22] Filed: Aug. 21, 1986

[51] Int. Cl.$^4$ ............................................. C08G 59/42
[52] U.S. Cl. ................................. 528/93; 525/327.3; 525/386; 528/89; 528/112; 528/297; 528/365
[58] Field of Search .................... 528/112, 297, 365; 525/327.3, 386

[56] References Cited

U.S. PATENT DOCUMENTS

| | | | |
|---|---|---|---|
| 2,683,131 | 7/1954 | Cass | 260/45.4 |
| 2,712,535 | 7/1955 | Fisch | 260/45.4 |
| 2,768,153 | 10/1956 | Shokal | 528/112 X |
| 2,857,354 | 10/1958 | Fang | 260/33.2 |
| 2,890,194 | 6/1959 | Phillips et al. | 260/45.4 |
| 2,890,210 | 6/1959 | Phillips et al. | 260/78.4 |
| 3,008,914 | 11/1961 | Fry | 260/33.4 |
| 3,179,714 | 4/1965 | Brockman et al. | 260/837 |
| 3,215,756 | 11/1965 | Lombardi et al. | 260/834 |
| 3,218,274 | 11/1965 | Boller et al. | 260/22 |
| 3,269,975 | 8/1966 | Lee | 260/37 |
| 3,408,215 | 10/1968 | Wismer et al. | 106/252 |
| 3,496,142 | 2/1970 | Clelford et al. | 528/112 X |
| 3,507,831 | 4/1970 | Avis et al. | 528/365 X |
| 3,519,604 | 7/1970 | Maurer | 528/112 |
| 3,523,143 | 8/1970 | Kwong | 260/835 |
| 3,528,935 | 9/1970 | Marion et al. | 260/23 |
| 3,547,885 | 12/1970 | Dante et al. | 528/112 X |
| 3,733,311 | 5/1973 | Hickner | 528/297 |
| 3,781,380 | 12/1973 | Labana et al. | 260/836 |
| 3,784,583 | 1/1974 | Smith | 528/112 X |
| 3,785,635 | 1/1974 | Labana et al. | 260/836 |
| 3,787,521 | 1/1974 | Labana et al. | 260/836 |
| 3,925,507 | 12/1975 | Katsimbas | 525/327.3 X |
| 3,932,367 | 1/1976 | Labana et al. | 260/78.4 |
| 3,953,644 | 4/1976 | Camelon et al. | 428/220 |
| 3,954,712 | 5/1976 | Lottanti et al. | 260/47 |
| 3,975,314 | 8/1976 | Smyk et al. | 260/2 |
| 4,046,727 | 9/1977 | Itoh et al. | 260/28.5 |
| 4,091,048 | 5/1978 | Labana et al. | 525/327.3 X |
| 4,102,942 | 7/1978 | Smith et al. | 260/836 |
| 4,226,755 | 10/1980 | Knecht | 260/31.4 |
| 4,291,137 | 9/1981 | Nakate et al. | 525/162 |
| 4,346,144 | 8/1982 | Craven | 428/335 |
| 4,350,790 | 9/1982 | Chattha | 525/110 |
| 4,359,554 | 11/1982 | Labana et al. | 525/386 |
| 4,374,954 | 2/1983 | Labana et al. | 525/327.3 X |
| 4,403,093 | 9/1983 | Hartman et al. | 528/297 |
| 4,418,182 | 11/1983 | Chattha | 525/438 |
| 4,465,815 | 8/1984 | Chattha | 525/443 |
| 4,471,025 | 9/1984 | Bernelin et al. | 428/413 |
| 4,548,963 | 10/1985 | Cluff et al. | 423/427 |

FOREIGN PATENT DOCUMENTS

84/00771 3/1984 PCT Int'l Appl. .
84/00770 3/1984 PCT Int'l Appl. .
84/00768 3/1984 PCT Int'l Appl. .

OTHER PUBLICATIONS

Handbook of Epoxy Resins, Henry Lee, Technical Director and Kris Neville, Project Engineer; The Epoxylite Corporation; published by McGraw-Hill, Inc., 1967; Chapter 11, pp. 11-17 to 11-22.

*Primary Examiner*—Earl Nielsen
*Attorney, Agent, or Firm*—Godfried R. Akorli

[57] ABSTRACT

Disclosed herein are high solids thermosetting coating compositions comprising hydroxy-functional polyepoxides and anhydrides as effective curing agents thereof. Films of these coating compositions are of remarkable appearance and are attended by remarkably low volatile organic content (VOC).

11 Claims, No Drawings

THERMOSETTING HIGH SOLIDS COATING COMPOSITION OF HYDROXY-FUNCTIONAL EPOXIES AND ANHYDRIDES

BACKGROUND OF THE INVENTION

1. Field of the Invention

The present invention is in the field of crosslinkable compositions comprising hydroxy-functional epoxy resins and anhydride curing agents. More specifically, the present invention relates to crosslinkable coating compositions having low volatile organic content which are particularly useful in color-plus-clear coating applications.

2. Brief Description of the Prior Art

Color-plus-clear coating systems involving the application of a colored or pigmented base coat to a substrate followed by the application of a transparent or clear top coat to the base coat are becoming increasingly popular as original finishes for automobiles. The color-plus-clear systems have outstanding gloss and distinctness of image, and the clear coat is particularly important for these properties. Illustratively, two-pack clear coat compositions comprising polyols such as polyester polyols, polyurethane polyols and acrylic polyols, and polyisocyanate curing agents give outstanding gloss and distinctness of image.

It is an object of the present invention to provide for a novel crosslinkable composition which provides for coatings which can be used in a wide variety of coatings applications. It is particularly the object of the present invention to provide a crosslinkable coating composition which can be formulated into a high solids coating composition with excellent adhesion, gloss and distinctness of image enabling the coating composition to be used as clear coats in a color-plus-clear coating system, particularly for use as an original finish for automobiles to provide remarkable appearance. It is furthermore the object of this invention to provide such a high solids crosslinkable composition having low volatile organic content (VOC).

SUMMARY OF THE INVENTION

In accordance with the foregoing, the present invention encompasses a high solids thermosetting coating composition which is characterized by high sprayability, acceptable sag control, very low volatile organic content (VOC), and other desirable film properties. Said coating composition comprises:

(a) a low molecular weight hydroxy-functional polyepoxide, and (b) a curing agent consisting essentially of an anhydride said coating composition is characterized in that it is curable in absence of another curing agent such as a melamine, to provide a hard and solvent resistant coating.

In the particularly preferred embodiment of this invention, the coating compositions typically contain cure catalysts such as tertiary amines or ammonium salts. The coating compositions of this embodiment have been found to be particularly suited to painting automobiles in the color-plus-clear mode to provide coatings having outstanding appearances and other desirable properties.

In this text, the terms molecular weight, solids content, volatile organic content (VOC) and appearance are defined as follows. The term "molecular weight" refers to a number average molecular weight as determined by gel permeation chromatography using a standard (such as polystyrene or glycol). Therefore, it is not the actual number average molecular weight which is measured but a number average molecular weight which is relative to the standard.

The solids (i.e., the non-volatile) content of a composition is determined by ASTM D-2369 testing modified as follows: 0.3 grams of the composition is mixed with 5 milliliters of 1:1 mixture of acetone and tetrahydrofuran and heated at 110° C. for 1 hour in a forced draft oven. The composition is then cooled in a desiccator, reweighed and the non-volatile content calculated. The percentage of weight of the composition remaining is the solids content.

The term "sprayability" means the maximum concentration of solids at which the coating composition can form a uniformly deposited coating, under normal spraying conditions of, say, temperature, pressure, and spray equipment design such as entails the use of an air suction gun operating at 60 psi with a No. 30 air cap. This maximum concentration is solvent dependent and usually occurs in a viscosity range of 20 to 80 and preferably at about 20 to 24 seconds with a No. 4 Ford cup at room temperature after thinning with a solvent such as a mixture of methyl amyl ketone and ethoxyethyl acetate. Above this maximum concentration, appearance of the coating as manifested by leveling and solvent popping typically becomes unacceptable.

The VOC is defined as the weight per volume of any compound of carbon which evaporates from a paint or related coating material under the specific conditions for the determination of the non-volatile content of that material. This does not include water which is volatile under the test conditions. Thus, the water content of the material undergoing analysis must be determined. To obtain the VOC of a sample, the non-volatile content, water content and the density of the material are determined. The VOC number is calculated by correcting the total organic volatile content for the water content and dividing by the volume of the paint corrected for the water content. The determination of the VOC is by ASTM D-3960 testing which entails heating the paint or related coating material at 110° C. for 1 hour.

Appearance is defined in terms of distinctness of image (DOI), which is measured by a Dorin-Gon Meter D47-6 manufactured by Hunter Laboratories.

DETAILED DESCRIPTION OF THE INVENTION

The coating compositions of this invention are high solids types. They have a sprayable solids content of about 45 percent or higher and preferably about 80 percent or higher. Also, the coating compositions have VOC of less than 3.6 pound per gallon and preferably less than 3 pounds per gallon, and down to about 1.8 pounds per gallon. As described more fully below, the components of the composition are selected on the basis that would result in high solids coating compositions having properties as described herein.

The hydroxy-functional polyepoxides useful herein are of low molecular weight and have epoxide equivalent weights of about 50 to 1000 and preferably about 100 to 300; and a hydroxy equivalent weight of about 50 to 1000 and preferably 100 to 500. Typically, the hydroxy-functional polyepoxides contain more than 2 and preferably 3 or more epoxy groups per molecule, and at least one hydroxyl group per molecule. Typical but non-limiting examples of the hydroxy-functional polyepoxides are hydroxy-functional glycidyl ethers, hydroxy-functional glycidyl esters, hydroxy-functional glycidyl acrylic polymers, hydroxy-functional glycidyl isocyanates, hydroxy-functional epoxidized oils, hydroxy-functional cycloaliphatic epoxies or a mixture thereof.

Illustrative examples of the preferred glycidyl ethers are diglycerol polyglycidyl ethers having 3 epoxy groups, such as are available from Nagase America Corporation under the tradename DENACOL.

Illustrative examples of the hydroxy-functional glycidyl acrylic polymers are copolymers of ethylenically unsaturated monomers, one of which contains a glycidyl group and another which contains a hydroxyl group. The copolymers are prepared by free radical polymerization of the ethylenically unsaturated monomers. Examples of the ethylenically unsaturated monomers containing a glycidyl group can be a glycidyl acrylate, a glycidyl methacrylate, and an allyl glycidyl ether. Examples of ethylenically unsaturated monomers containing hydroxyl groups can be hydroxyethyl acrylate, hydroxyethyl methacrylate, hydroxypropyl acrylate, hydroxypropyl methacrylate, and the like. Other monomers that can be copolymerized with the above monomers can be alkyl esters of acrylic or methacrylic acid, e.g., ethyl acrylate, butyl acrylate or 2-ethylhexyl acrylate, ethyl methacrylate, butyl methacrylate and the like; vinyl monomers such as styrene, vinyl toluene and the like.

The anhydrides useful herein are of low molecular weight, and are typically acid anhydrides comprising monoanhydrides. The molecular weight of the anhydrides can be in the range of about 100 to 500 and preferably about 100 to 200. Examples of the preferred monoanhydrides are alkyl hexahydrophthalic anhydrides wherein the alkyl group has up to 7 carbon atoms. A particularly preferred monoanhydride is methyl hexahydrophthalic anhydride. Other anhydrides that can be used herein are succinic anhydride, methyl succinic anhydride, dodecenyl succinic anhydride, octadecenyl succinic anhydride, phthalic anhydride, tetrahydrophthalic anhydride, methyltetrahydrophthalic anhydride and the like. In the preferred embodiment of the invention, the polyacid anhydrides consist essentially of monoanhydrides such as described herein above.

The cure catalysts useful herein can be selected from the group consisting of tertiary amines such as dimethyldodecyl amine or dimethylethanol amine; onium compounds such as quaternary ammonium salt, e.g., tetrabutyl ammonium fluoride, tetrabutyl ammonium bromide, tetrabutyl ammonium hydroxide; phosphonium salts and the like.

The proportion in which the components are employed is such as leads to the formation of gellable compositions that can cure effectively. Hence, the equivalent ratio of the anhydride curing agent to the hydroxy-functional epoxy resins based on the anhydride to the hydroxyl group can be from about 0.5 to 20:1 and preferably 1 to 5:1. The equivalent ratio of the anhydride to the epoxy can be from about 0.3 to 5:1 and preferably about 0.5 to 2:1.

The aforedescribed components can be formulated into the claimed coating compositions which are typically solvent-based. The hydroxy-functional polyepoxide can be employed with only the anhydride as the curing agent to produce the claimed thermosetting coating compositions which can be heated to temperature sufficient to cure effectively. The cured coatings are hard and solvent resistant and can possess other desirable properties. Unlike the case of art-related coatings, other curing agents such as aminoplasts e.g., melamines are not required to provide effective cure. Accordingly, the claimed invention can be said to encompass thermosetting high solids coating compositions consisting essentially of a hydroxy-functional polyepoxide, and an anhydride as a curing agent therefor. It is, however, desired to point out that while the likes of aminoplasts are not required to effect cure, they can nontheless be employed as coating additives in less than the art-required curing amounts.

It is a distinct feature of the invention that the claimed thermosetting coating compositions are free of, or substantially free of other curing agents, particularly melamine resins. This feature of the invention is all the more significant in the particularly preferred embodiment, wherein appearance is an important criterion. In this embodiment, the coating compositions typically contain cure catalysts such as tertiary amines or quaternary ammonium salts. Accordingly, in this embodiment the coating compositions consist essentially of the hydroxy-function polyepoxide, the anhydride and the cure catalyst.

In the coating formulation, additives such as ultraviolet light absorbers and/or stablizers, flow control agents, antioxidants, plasticizers and the like can be employed. These additives can be employed in amounts up to about 25 percent by weight based on the total resin weight.

It is envisaged that the coating compositions of this invention can be practiced as multi-pack such as a two-pack coating compositions. For example, the hydroxy-functional polyepoxide and the cure catalyst can be employed in one pack and the anhydride in another.

The coating composition can be applied to a substrate by any of the conventional coating techniques such as brushing, spraying, dipping or flowing, but it is preferred that spray applications be used since this gives the best appearance. Any of the known spray techniques may be employed such as compressed air spraying, electrostatic spraying and either manual or automatic methods.

It is a distinct feature of the invention that the high solids thermosetting coating compositions of this invention display an acceptably good sag control at a film thickness of up to about 2 mils. Considering that coating compositions comprising low molecular weight components generally have sag control problems, it is indeed surprising that the instant coatings having low molecular weight components have the acceptable sag control. Thus, relatively lower amounts, if any at all, of sag control agents need to be added to the coating composition. Therefore, these coating compositions do not suffer a reduced solids content and poorer appearance, as is otherwise the case with art-related high solids compositions wherein sag control agents are added.

After application of the coating composition to the substrate, the coated substrate is heated to cure the coating. In the curing operation, solvents are driven off and the film-forming material of the top coat and/or of the base coat is crosslinked. The heating or curing operation is usually carried out at a temperature in the range of from 160°–350° F. (71°–177° C.) but if needed lower or higher temperatures may be used depending upon whether it is sufficient to activate any necessary crosslinking mechanisms. The thickness of the coating is usually from about 1 to 5, preferably 1.2 to 3 mils.

The preferred coating compositions of the present invention, particularly those prepared with the aliphatic polyepoxides, are used as clear coats for use in a color-plus-clear application. In a color-plus-clear application, a composite coating is applied to a substrate. The process comprises applying to the substrate a pigmented or colored film-forming composition to form a base coat and applying to the base coat a second film-forming composition to form a transparent top coat over the base coat.

The film-forming composition of the base coat can be any of the compositions useful in coating applications, particularly automotive applications in which the color-plus-clear coating applications are finding their most use. The film-forming composition conventionally comprises a resinous binder and is employed in combination with a pigment which acts as a colorant. Particularly useful resinous binders are acrylic polymers, polyesters including alkyds and polyurethanes. The resinous binder for the base coat can be an organic solvent-based material such as those described in U.S. Pat. No. 4,220,679, note column 2, line 24, continuing through column 4, line 40. Also, water-based coating compositions such as those described in U.S. Pat. No. 4,403,003 and U.S. Pat. No. 4,147,679 can also be used as the binder in the base coat composition. The resinous binder for the base coat can also be the same as those of the present invention.

As afore-stated, the base coat composition also contains pigments including metallic pigmentation to give it color. Examples of suitable pigmentations for the base coat are described in the aforementioned U.S. Pat. Nos. 4,220,679; 4,403,003 and 4,147,679.

Optional ingredients in the base coat composition are those which are well known in the art of formulating surface coatings and include surfactants, flow control agents, thixotropic agents, fillers, anti-gassing agents, organic co-solvents, catalysts and other customary auxiliaries. Examples of these materials and suitable amounts are described in the aforementioned U.S. Pat. Nos. 4,220,679; 4,403,003 and 4,147,679, but they are most often applied by spraying. The coating compositions can be applied by air spraying and electrostatic spraying in either manual or automatic methods which are preferred.

During application of the base coat to the substrate, a film of the base coat is formed on the substrate typically in a thickness of about 0.1 to 5 and preferably about 0.1 to 2 mils. After forming a film of the base coat on the substrate, solvent, that is, organic solvent and/or water, is driven out of the base coat film by heating or simply an air drying period before application of the clear coat. Preferably, the heating step will be for a short period of time sufficient to insure that the clear top coat composition can be applied to the base coat without the former dissolving the base coat composition, that is, "striking in". Suitable drying conditions will depend on the particular base coat composition, on the ambient humidity with certain water-based compositions, but in general a drying time of from about 1 to 5 minutes at a temperature of about 80°–175° F. (20°–79° C.) will be adequate to insure that mixing of the two coats is minimized. At the same time, the base coat film is adequately wetted by the clear top coat composition so that satisfactory intercoat adhesion can be obtained. Also, more than one base coat and more than one top coat may be applied to develop optimum appearance. Usually between coats, the previously applied base coat or top coat is flashed, that is, exposed to ambient conditions for about 1 to 20 minutes.

The clear top coat composition is applied to the base coat by any of the conventional coating techniques mentioned above, although spray applications are typical. As mentioned above, the clear top coat is applied to the base coat via a wet-on-wet technique before the base coat has been cured. The two coatings are then heated to a temperature sufficient to cure and to conjointly harden both coating layers. Curing conditions such as described above can be used. In the preferred embodiments of the invention, the cured coatings are hard, solvent-resistance and possess the remarkable appearance and other desirable film properties.

Appearance of the color-plus-clear systems of this invention is remarkable. DOI of the coating can range up to about 100. Overall, the combination of highly desirable properties of the claimed coatings, to wit, high solids, high sprayability, low VOC, acceptable sag control and excellent appearance, markedly distinguishes the claimed coating over art-related coatings.

The invention will be further defined by reference to the following examples. Unless otherwise indicated, all parts are by weight.

EXAMPLE A

This example illustrates a high solids thermosetting clear coating composition and the methods of preparing and using the same.

| Ingredients | Parts by Weight (grams) | Solids |
|---|---|---|
| Pack A | | |
| TINUVIN 328[1] | 3.0 | 3.0 |
| Methyl ethyl ketone | 16.5 | |
| TINUVIN 292[2] | 1.0 | 1.0 |
| Silicone fluid[3] (10% solution in xylene) | 1.0 | 0.1 |
| ARMEEN DM 12D[4] | 2.0 | 2.0 |
| DENACOL 421[5] | 48.0 | 48.0 |
| Cellulose acetate butyrate | 4.0 | 1.0 |
| Pack B | | |
| Methylhexahydrophthalic anhydride | 52.0 | 52.0 |

[1]UV absorber available from Ciba Geigy Corp.
[2]UV stabilizer available from Ciba Geigy Corp.
[3]Available as DC 200 10CS from Dow Corning Co.
[4]Dimethyldodecylamine available from Akzo Chemical Co.
[5]Diglycerol polyglycidyl ether from Nagase America Corp.

The above ingredients were formulated into a clear coating composition by mixing them at a low shear with good agitation. The resultant composition had a solids content of 87.3 percent measured at 110° C. after 60 minutes, and a viscosity of 22 seconds measured with a number 4 Ford cup.

The clear coat was spray applied over a panel of steel substrates that had been electrocoated with UNI-PRIME ® (which is a cationic electrodepositable composition available from PPG Industries, Inc.) and baked at 340° F. (171° C.) for 30 minutes. The electrocoated panels were spray painted with a base coat (available from ICI Limited as M-979) to a film thickness of 0.3 mil. The panels were then flashed for 3 minutes at 150° F. (66° C.), before the above clear coat was spray applied. The resultant color-plus-clear coat had a film thickness of 1.4 mils, DOI was 90, and Tukon hardness of 8.2.

EXAMPLE B

This example illustrates a high solids thermosetting clear coating composition and the methods of preparing and using the same.

| Ingredients | Parts by Weight (grams) | Solids |
|---|---|---|
| Pack A | | |
| TINUVIN 1130[2] | 3.0 | 3.0 |
| TINUVIN 292 | 1.0 | 1.0 |
| Silicone fluid (10% solution in xylene) | 1.0 | 0.1 |
| Cellulose acetate butyrate | 4.0 | 1.0 |
| ARMEEN DM 12D | 3.0 | 3.0 |
| Epoxy Hydroxy-functional Acrylic Polymer[2] | | |
| Polymeric acid[3] | 4.3 | 3.0 |
| Methyl ethyl ketone | 16.5 | |
| Pack B | | |
| Methylhexahydrophthalic anhydride | 34.0 | 34.0 |

[1]UV absorber available from Ciba Geigy Corp.
[2]The acrylic polymer was derived from 40% glycidyl methacrylate/15% butyl acrylate/25% methylmethacrylate/10% CARDUARA/Acrylic acid. (CARDUARA E which is an epoxy ester of Versatic acid, available from Shell Chemical Co. was herein reacted with acrylic acid).
[3]Polymeric acid derived from 2 moles of hexahydropthalic anhydride and 1 mole of 1,6-hexanediol.

The above ingredients were formulated into a clear coating composition by mixing them at a low shear with good agitation. The resultant composition had a solids content of 65.6 percent measured at 110° C. after 60 minutes, and a viscosity of 22 seconds measured with a number 4 Ford cup.

The clear coating composition was spray applied over a panel of steel substrates that had been electrocoated with UNI-PRIME ® (which is a cationic electrodepositable composition available from PPG Industries, Inc.) and baked at 340° F. (171° C.) for 30 minutes. The electrocoated panels were spray painted with a base coat (available from ICI Limited as M-979) to a film thickness of 0.3 mil. The panels are then flashed for 3 minutes at 150° F. (66° C.), before the above clear coat coating was composition spray applied. The resultant color-plus-clear coat had a film thickness of 1.4 mils, gloss (at 20 degree angle) was 86, DOI of 90, and Tukon hardness of 10.10.

EXAMPLE C

This example further illustrates the clear coating composition of this invention and the methods of making and using the same.

| Ingredients | Parts by Weight (grams) | Solids |
|---|---|---|
| Pack A | | |
| TINUVIN 1130 | 3.0 | 3.0 |
| TINUVIN 292 | 3.0 | 3.0 |
| Silicone fluid | 1.0 | 0.1 |
| ARMEEN DM 12D | 3.0 | 3.0 |
| Cellulose acetate butyrate | 4.0 | 1.0 |
| Polymeric acid[1] | 4.3 | 3.0 |
| Hydroxy-functional glycidyl acrylic polymer[2] | 104.0 | 60.3 |
| Pack B | | |
| Methylhexahydrophthalic anhydride | 31.2 | 31.2 |

[1]Same as in Example A.
[2]Same as in Example B.

The above ingredients were formulated by mixing them in the order indicated above at low shear with good agitation. The resultant composition had a determined solids content of about 70 percent (at 110° C. for 60 minutes) and viscosity of 31.5 seconds measured with a number 4 Ford cup.

The clear coating with spray applied wet-on-wet in a color-plus-clear mode as described in Example A. The resultant coating had a film thickness of 2 mils, DOI of 90 and Tukon hardness of 12.50.

What is claimed is:

1. A high solids thermosetting composition comprising:
   (a) a low molecular weight hydroxy-functional polyepoxide having more than two epoxy groups per molecule,
   (b) a curing agent consisting essentially of an anhydride,
   (c) a cure catalyst selected from the group consisting essentially of amines and ammonium salts,
   said coating composition is characterized in that it is sprayable, has a solids content of about 45 to 85 percent, and it is curable in the absence of a melamine curing agent.

2. A high solids thermosetting coating composition of claim 1 wherein the polyepoxide has an epoxide equivalent weight of 50 to 1000.

3. A high solids thermosetting coating composition of claim 1 wherein the hydroxy functional polyepoxide is selected from the group consisting of an glycidyl acrylic polymer, a glycidyl ether, a glycidyl ester, glycidyl isocyanate, epoxidized oils, cycloalphatic epoxides and a mixture thereof.

4. A high solids thermosetting coating composition of claim 1 wherein the hydroxy functional polyepoxide contains three or more epoxy groups.

5. A high solids thermosetting coating composition of claim 1 wherein the hydroxy-functional polyepoxide is aliphatic.

6. A high solids thermosetting coating composition of claim 1 wherein the hydroxy-functional polyepoxide has a hydroxy equivalent of 50 to 1000.

7. A high solids thermosetting coating composition of claim 1, wherein the anhydride curing agent is an acid anhydride comprising a monoanhydride.

8. A high solids thermosetting coating composition of claim 7 wherein the monoanhydride is an alkyl hexahydrophthalic anhydride wherein the alkyl group contains up to about seven carbon atoms.

9. A high solids thermosetting coating composition of claim 8 wherein the monoanhydride is methyl hexahydrophthalic anhydride.

10. A high solids thermosetting composition of claim 1 having a VOC of about 3.6 pounds per gallon, or less.

11. An article of matter which is prepared by applying to the surface of a substrate the coating composition of claim 1.

* * * * *